US010857684B2

(12) United States Patent
Zapolsky et al.

(10) Patent No.: US 10,857,684 B2
(45) Date of Patent: Dec. 8, 2020

(54) ROBOTS WITH PERCEPTION-BASED FIBER-OPTIC TACTILE SENSING AND METHODS FOR PROVIDING THE SAME

(71) Applicant: Toyota Research Institute, Inc., Los Altos, CA (US)

(72) Inventors: Samuel Zapolsky, San Francisco, CA (US); Kevin Stone, Palo Alto, CA (US); Matthew Amacker, Santa Clara, CA (US); Arshan Poursohi, Berkley, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 135 days.

(21) Appl. No.: 16/164,630

(22) Filed: Oct. 18, 2018

(65) Prior Publication Data
US 2020/0122345 A1    Apr. 23, 2020

(51) Int. Cl.
*B25J 19/02* (2006.01)
*B25J 13/08* (2006.01)
*B25J 9/00* (2006.01)
*G02B 6/44* (2006.01)

(52) U.S. Cl.
CPC .......... *B25J 19/025* (2013.01); *B25J 9/0009* (2013.01); *B25J 13/084* (2013.01); *G02B 6/4415* (2013.01); *G02B 6/4463* (2013.01)

(58) Field of Classification Search
CPC ...................................... B25J 19/025
See application file for complete search history.

(56) References Cited

U.S. PATENT DOCUMENTS 4,405,197 A * 9/1983 Bejczy .................... G01L 1/247
250/227.11
4,547,668 A * 10/1985 Tsikos ..................... G01L 5/228
250/227.21

(Continued)

FOREIGN PATENT DOCUMENTS

CN         203848958 U       9/2014

OTHER PUBLICATIONS

Tom Fleischman, "Engineers integrate internal robotic tactile sensors", Phys.org, Dec. 12, 2016, https://phys.org/news/2016-12-internal-robotic-tactile-sensors.html (2 pages total).

(Continued)

*Primary Examiner* — Rhonda S Peace
(74) *Attorney, Agent, or Firm* — Dinsmore & Shohl LLP

(57) ABSTRACT

Systems and methods for perception-based tactile sensing in a robot are provided. The robot may include an external portion and an illuminator that outputs illumination. The robot may further include a receiving sensor that receives illumination. The robot may also include a pair of conduits, located at an external portion, that include an injecting conduit that traverses one or more housings of the robot. The injecting conduit may be configured to receive the illumination from the illuminator and output the illumination to illuminate an object external to the robot. The pair of conduits may also include a receiving conduit, traversing one or more housings of the robot, configured to receive the illumination from the object external to the robot and output the illumination to the receiving sensor.

19 Claims, 7 Drawing Sheets

(56) References Cited

U.S. PATENT DOCUMENTS

| | | | | |
|---|---|---|---|---|
| 4,886,361 | A * | 12/1989 | Furstenau | B25J 13/084 |
| | | | | 356/477 |
| 9,030,653 | B1 | 5/2015 | Buyuksahin | |
| 9,032,811 | B2 * | 5/2015 | Miyauchi | B25J 13/084 |
| | | | | 73/800 |
| 9,446,521 | B2 | 9/2016 | Casey et al. | |
| 9,513,178 | B2 | 12/2016 | Tar et al. | |
| 9,770,824 | B2 * | 9/2017 | Hahakura | B25J 19/04 |
| 10,359,329 | B2 * | 7/2019 | Buyuksahin | B25J 13/084 |
| 10,574,909 | B2 * | 2/2020 | Price | H04N 5/332 |
| 2003/0063185 | A1 * | 4/2003 | Bell | H04N 9/045 |
| | | | | 348/46 |
| 2013/0090763 | A1 * | 4/2013 | Simaan | A61B 5/11 |
| | | | | 700/258 |
| 2013/0215235 | A1 * | 8/2013 | Russell | H04N 13/243 |
| | | | | 348/47 |
| 2016/0158942 | A1 | 6/2016 | Augenbraun et al. | |
| 2017/0043483 | A1 | 2/2017 | Fine et al. | |
| 2019/0056248 | A1 * | 2/2019 | Shepherd | B25J 9/142 |
| 2020/0122345 | A1 * | 4/2020 | Zapolsky | B25J 13/084 |

OTHER PUBLICATIONS

Brenda Miao, "Dextrous robotic hands: new fiber optic sensors and stretchable optical sensors", Dartmouth Undergraduate Journal of Science, In Applied Sciences, Fall 2015, Nov. 20, 2015, http://dujs.dartmouth.edu/2015/11/dextrous-robotic-hands-new-fiber-optic-sensors-and-stretchable-optical-sensors/#.WIXO-66WbDc (1 page total).

Carnegie Mellon University, "A light touch: Embedded optical sensors could make robotic hands more dexterous", Phys.org, Sep. 28, 2015, https://phys.org/news/2015-09-embedded-optical-sensors-robotic-dexterous.html#nRIv (2 pages total).

* cited by examiner

ROBOTS WITH PERCEPTION-BASED FIBER-OPTIC TACTILE SENSING AND METHODS FOR PROVIDING THE SAME

TECHNICAL FIELD

The present application generally relates to robotics, and, more particularly, to a robot that can perform tactile sensing utilizing fiber optics.

BACKGROUND

Robots can function by utilizing a variety of sensory perceptions to experience their surroundings. For example, robots may utilize cameras for visual perception and audio sensors for to perceive sounds. However, it can be expensive and hardware intensive to provide a robot with sensors all over its body to provide a robot with a sense of touch.

SUMMARY

In one embodiment, a robot having perception-based tactile sensing may include an external portion and an illuminator configured to output illumination. The robot may further include a receiving sensor configured to receive illumination. The robot may further still include a pair of conduits including an injecting conduit, traversing one or more housings of the robot, configured to receive the illumination from the illuminator and output the illumination to illuminate an object external to the robot. The pair of conduits may further include a receiving conduit, traversing one or more housings of the robot, configured to receive the illumination from the object external to the robot and output the illumination to the receiving sensor.

In another embodiment, a robot having perception-based tactile sensing may include one or more external portions and an illuminator configured to output illumination. The robot may further include a receiving sensor configured to receive illumination. The robot may also include a plurality of pairs of conduits each located at the one or more external portions, wherein each pair may include an injecting conduit, traversing one or more housings of the robot, configured to receive the illumination from the illuminator and output the illumination to illuminate an object external to the robot, wherein the injecting conduit may be configured to directly provide illumination originating from the illuminator to an exterior point on the robot. Each pair may further include a receiving conduit, traversing one or more housings of the robot, configured to receive the illumination from the object external to the robot and output the illumination to the receiving sensor, wherein the receiving conduit may be configured to directly provide illumination received at the exterior point on the robot to the receiving sensor. The robot may further include a plurality of conduit bundles, where at least two of the conduit bundles may each include a plurality of injecting conduits and a plurality of receiving conduits and the injecting conduits in the plurality of bundles originate from the illuminator. The robot may also further include an external skin having exterior points each comprising a lens or window. The robot may further still include a processor configured to calibrate the location of each of a plurality of exterior points with respect to exterior portions of the robot.

In yet another embodiment, a method for perception-based tactile sensing in a robot may include providing, by an illuminator within the robot, illumination to an injecting conduit and outputting illumination from the injecting conduit at an exterior point of the robot. The method may further include receiving, at the exterior point of the robot, illumination reflected back from an object external to the robot. The method may also include providing the received illumination through a receiving conduit to a receiving sensor within the robot.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to systems and methods for robots that can perform tactile sensing utilizing fiber optics. For example, robots may lack any tactile sensing ability, or may have sensors requiring physical contact for tactile sensing. In some embodiments a robot having the ability of tactile sensing without the need for physical contact with external objects may be desirable. Particularly, embodiments described herein emit light onto an external object in close proximity, and detect reflected light to provide the robot with a sense of "touch." The robot may utilize injecting conduits to provide illumination from an illuminator to an object external to the robot. The robot may then receive the illumination reflected back by the external object at receiving conduits. The receiving conduits may then provide the received illumination to a receiving sensor, which may be utilized to make tactile observations regarding the external object.

Figure 1:
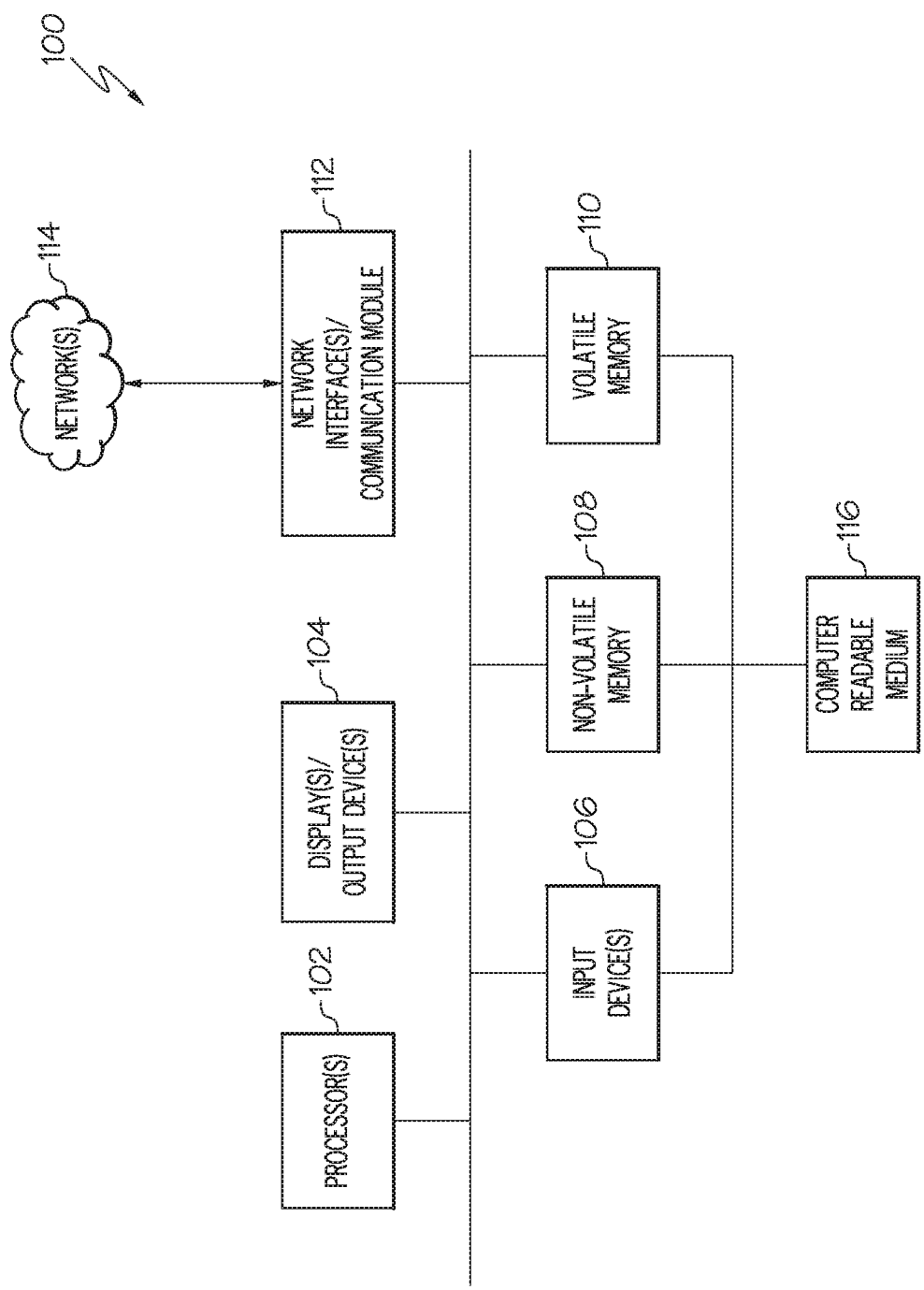
FIG. 1 is a block diagram illustrating computing hardware utilized in one or more devices for implementing various processes and systems, according one or more embodiments described and illustrated herein.

Referring now to FIG. 1, a block diagram illustrates an example of a computing device 100, through which embodiments of the disclosure can be implemented, such as (by way of non-limiting example) a robot 200 or any other suitable device described herein. The computing device 100 described herein is but one example of a suitable computing device and does not suggest any limitation on the scope of any embodiments presented. Nothing illustrated or described with respect to the computing device 100 should be interpreted as being required or as creating any type of dependency with respect to any element or plurality of elements. In various embodiments, a computing device 100 may be, by way of non-limiting example, a robot 200, which is discussed in more detail below and depicted in FIG. 2. In an embodiment, the computing device 100 includes at least one processor 102 and memory (non-volatile memory 108 and/or volatile memory 110). The computing device 100 can include one or more displays and/or output devices 104 such as monitors, speakers, headphones, projectors, wearable-displays, holographic displays, and/or printers, for example. The computing device 100 may further include one or more input devices 106 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 100 may include non-volatile memory 108 (ROM, flash memory, etc.), volatile memory 110 (RAM, etc.), or a combination thereof. A network interface 112 can facilitate communications over a network 114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 112 can be communicatively coupled to any device capable of transmitting and/or receiving data via the network 114. Accordingly, the hardware of the network interface 112 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 116 may comprise a plurality of computer readable mediums, each of which may be either a computer readable storage medium or a computer readable signal medium. A computer readable storage medium 116 may reside, for example, within an input device 106, non-volatile memory 108, volatile memory 110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a robot 200 and/or a server may utilize a computer readable storage medium to store data received from an illuminator 302 and/or a receiving sensor 312 in the robot 200.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 100, such as a robot 200, may include one or more network interfaces 112 to facilitate communication with one or more remote devices, which may include, for example, client and/or server devices. In various embodiments the computing device (for example a robot) may be configured to communicate over a network with a server or other network computing device to transmit and receive data from a robot 200. A network interface 112 may also be described as a communications module, as these terms may be used interchangeably.

Figure 2:
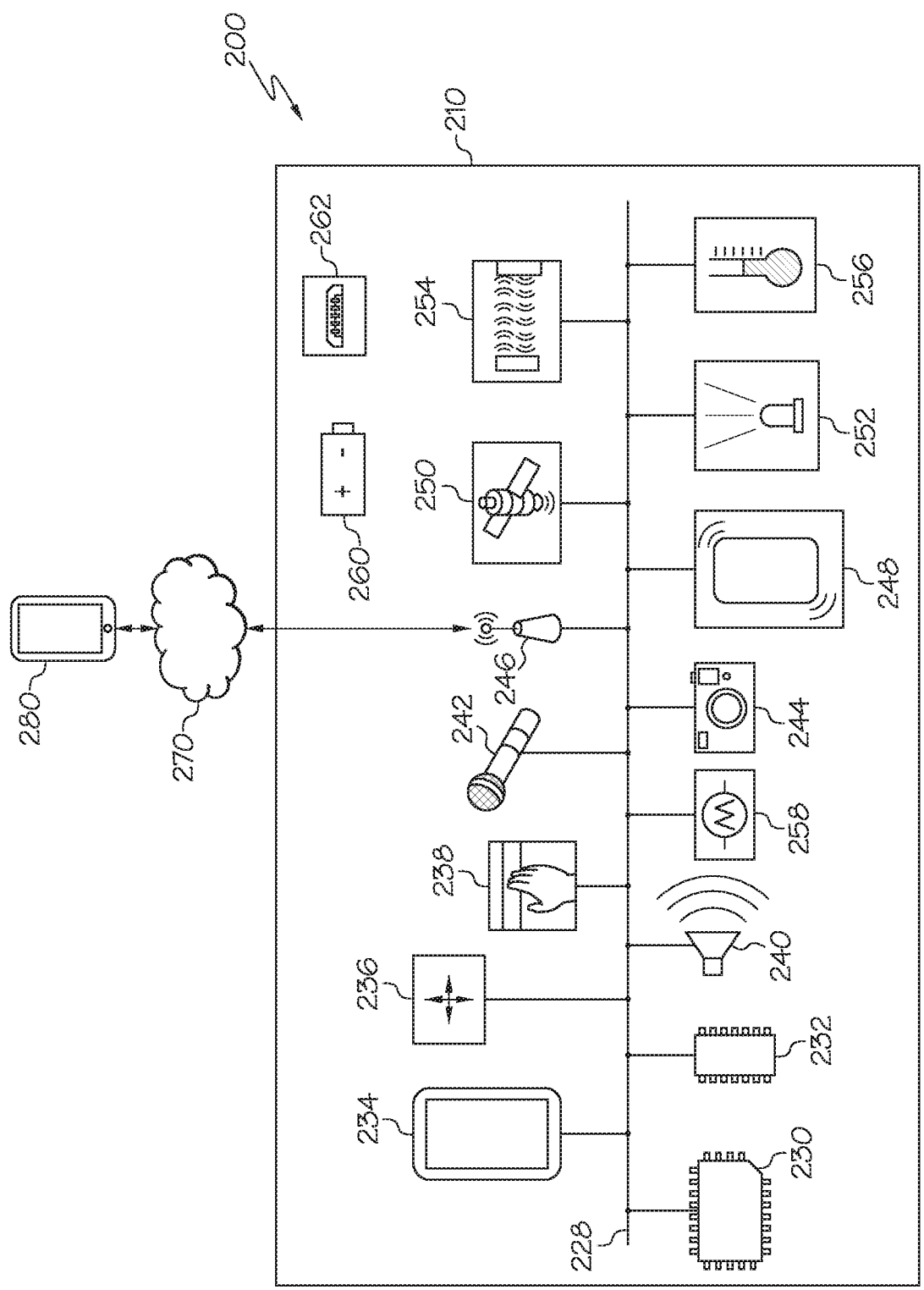
FIG. 2 is a block diagram illustrating hardware utilized in one or more robots for implementing various processes and systems, according one or more embodiments described and illustrated herein.

Turning now to FIG. 2, example components of one non-limiting embodiment of a robot 200 are schematically depicted. As used herein, a robot 200 may refer to one or more robots 200. The robot 200 includes a housing 210, a communication path 228, a processor 230, a memory module 232, an output device 234, an inertial measurement unit 236, an input device 238, an audio output device 240 (e.g., a speaker), a microphone 242, a camera 244, network interface hardware 246, a tactile feedback device 248, a location sensor 250, a light 252, a proximity sensor 254, a temperature sensor 256, a motorized wheel assembly 258, a battery 260, and a charging port 262. The components of the robot 200 other than the housing 210 may be contained within or mounted to the housing 210. The robot 200 may be fully-autonomous, semi-autonomous, or non-autonomous in various embodiments. The various components of the robot 200 and the interaction thereof will be described in detail below.

Still referring to FIG. 2, the communication path 228 may be formed from any medium that is capable of transmitting a signal such as, for example, conductive wires, conductive traces, optical waveguides, or the like. Moreover, the communication path 228 may be formed from a combination of mediums capable of transmitting signals. In one embodiment, the communication path 228 comprises a combination of conductive traces, conductive wires, connectors, and buses that cooperate to permit the transmission of electrical data signals to components such as processors, memories, sensors, input devices, output devices, and communication devices. Accordingly, the communication path 228 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 228 communicatively couples the various components of the robot 200. As used herein, the term "communicatively coupled" means that coupled components are capable of exchanging data signals with one another such as, for example, electrical signals via conductive medium, electromagnetic signals via air, optical signals via optical waveguides, and the like.

The processor 230 of the robot 200 may be any device capable of executing machine-readable instructions. Accordingly, the processor 230 may be a controller, an integrated circuit, a microchip, a computer, or any other computing device. The processor 230 may be communicatively coupled to the other components of the robot 200 by the communication path 228. This may, in various embodiments, allow the processor 230 to receive data from the illuminator 302 and/or receiving sensor 312, which may be part of the robot 200. Accordingly, the communication path 228 may communicatively couple any number of processors with one another, and allow the components coupled to the communication path 228 to operate in a distributed computing environment. Specifically, each of the components may operate as a node that may send and/or receive data. While the embodiment depicted in FIG. 2 includes a single processor 230, other embodiments may include more than one processor.

Still referring to FIG. 2, the memory module 232 of the robot 200 is coupled to the communication path 228 and communicatively coupled to the processor 230. The memory module 232 may, for example, contain instructions to detect an external object 502 with respect to an exterior surface 404 of the robot 200. In this example, these instructions stored in the memory module 232, when executed by the processor 230, may allow for the detection of an external object 502 based upon illumination 504, provided by injector conduits 306, becoming reflected illumination 506 provided by an external object 502 and received by receiving conduits 310. The memory module 232 may comprise RAM, ROM, flash memories, hard drives, or any non-transitory memory device capable of storing machine-readable instructions such that the machine-readable instructions can be accessed and executed by the processor 230. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 232. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 232, other embodiments may include more than one memory module.

The output device 234, if provided, is coupled to the communication path 228 and communicatively coupled to the processor 230. The output device 234 may, by way of non-limiting example, include displays and/or output devices 104 such as monitors, speakers, headphones, projectors, wearable-displays, holographic displays, printers, and/or anything else capable of being part of or coupled to the robot 200. For example, the output device 234 may provide a visual depiction of the pixels generated at the receiving sensor 312.

The inertial measurement unit 236, if provided, is coupled to the communication path 228 and communicatively coupled to the processor 230. The inertial measurement unit 236 may include one or more accelerometers and one or more gyroscopes. The inertial measurement unit 236 transforms sensed physical movement of the robot 200 into a signal indicative of an orientation, a rotation, a velocity, or an acceleration of the robot 200. The operation of the robot 200 may depend on an orientation of the robot 200 (e.g., whether the robot 200 is horizontal, tilted, and the like). Some embodiments of the robot 200 may not include the inertial measurement unit 236, such as embodiments that include an accelerometer but not a gyroscope, embodiments that include a gyroscope but not an accelerometer, or embodiments that include neither an accelerometer nor a gyroscope.

Still referring to FIG. 2, one or more input devices 238 are coupled to the communication path 228 and communicatively coupled to the processor 230. The input device 238 may be any device capable of transforming user contact into a data signal that can be transmitted over the communication path 228 such as, for example, a button, a switch, a knob, a microphone or the like. In various embodiments an input device 238 may be an illuminator 302 or a receiving sensor 312 as described above. In some embodiments, the input device 238 includes a power button, a volume button, an activation button, a scroll button, or the like. The one or more input devices 238 may be provided so that the user may interact with the robot 200, such as to navigate menus, make selections, set preferences, and other functionality described herein. In some embodiments, the input device 238 includes a pressure sensor, a touch-sensitive region, a pressure strip, or the like. It should be understood that some embodiments may not include the input device 238. As described in more detail below, embodiments of the robot 200 may include multiple input devices disposed on any surface of the housing 210. In some embodiments, one or more of the input devices 238 are configured as a fingerprint sensor for unlocking the robot. For example, only a user with a registered fingerprint may unlock and use the robot 200.

The speaker 240 (i.e., an audio output device) is coupled to the communication path 228 and communicatively coupled to the processor 230. The speaker 240 transforms audio message data from the processor 230 of the robot 200 into mechanical vibrations producing sound. For example, the speaker 240 may provide to the user navigational menu information, setting information, status information, information regarding the environment as detected by image data from the one or more cameras 244, and the like. However, it should be understood that, in other embodiments, the robot 200 may not include the speaker 240.

The microphone 242 is coupled to the communication path 228 and communicatively coupled to the processor 230. The microphone 242 may be any device capable of transforming a mechanical vibration associated with sound into an electrical signal indicative of the sound. The microphone 242 may be used as an input device 238 to perform tasks, such as navigate menus, input settings and parameters, and any other tasks. It should be understood that some embodiments may not include the microphone 242.

Still referring to FIG. 2, the camera 244 is coupled to the communication path 228 and communicatively coupled to the processor 230. The camera 244 may be any device having an array of sensing devices (e.g., pixels) capable of detecting radiation in a laser, an ultraviolet wavelength band, a visible light wavelength band, or an infrared wavelength band. The camera 244 may have any resolution. The camera 244 may be an omni-directional camera, or a panoramic camera. In some embodiments, one or more optical components, such as a mirror, fish-eye lens, or any other type of lens may be optically coupled to the camera 244. As described in more detail below, the camera 244 is a component of an imaging assembly 222 operable to capture image data.

The network interface hardware 246 is coupled to the communication path 228 and communicatively coupled to the processor 230. The network interface hardware 246 may be any device capable of transmitting and/or receiving data via a network 270. Accordingly, network interface hardware 246 can include a wireless communication module configured as a communication transceiver for sending and/or receiving any wired or wireless communication. For example, the network interface hardware 246 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 246 includes hardware configured to operate in accordance with the Bluetooth wireless communication protocol. In another embodiment, network interface hardware 246 may include a Bluetooth send/receive module for sending and receiving Bluetooth communications to/from a portable electronic device 280. The network interface hardware 246 may also include a radio frequency identification ("RFID") reader configured to interrogate and read RFID tags.

In some embodiments, the robot 200 may be communicatively coupled to a portable electronic device 280 via the network 270. In some embodiments, the network 270 is a personal area network that utilizes Bluetooth technology to communicatively couple the robot 200 and the portable electronic device 280. In other embodiments, the network 270 may include one or more computer networks (e.g., a personal area network, a local area network, or a wide area network), cellular networks, satellite networks and/or a global positioning system and combinations thereof. Accordingly, the robot 200 can be communicatively coupled to the network 270 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the network 270 may be utilized to communicatively couple the robot 200 with the portable electronic device 280. The portable electronic device 280 may include a mobile phone, a smartphone, a personal digital assistant, a camera, a dedicated mobile media player, a mobile personal computer, a laptop computer, and/or any other portable electronic device capable of being communicatively coupled with the robot 200. The portable electronic device 280 may include one or more processors and one or more memories. The one or more processors can execute logic to communicate with the robot 200. The portable electronic device 280 may be configured with wired and/or wireless communication functionality for communicating with the robot 200. In some embodiments, the portable electronic device 280 may perform one or more elements of the functionality described herein, such as in embodiments in which the functionality described herein is distributed between the robot 200 and the portable electronic device 280.

The tactile feedback device 248 is coupled to the communication path 228 and communicatively coupled to the processor 230. The tactile feedback device 248 may be any device capable of providing tactile feedback to a user. The tactile feedback device 248 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 248.

The location sensor 250 is coupled to the communication path 228 and communicatively coupled to the processor 230. The location sensor 250 may be any device capable of generating an output indicative of a location. In some embodiments, the location sensor 250 includes a global positioning system (GPS) sensor, though embodiments are not limited thereto. Some embodiments may not include the location sensor 250, such as embodiments in which the robot 200 does not determine a location of the robot 200 or embodiments in which the location is determined in other ways (e.g., based on information received from the camera 244, the microphone 242, the network interface hardware 246, the proximity sensor 254, the inertial measurement unit 236 or the like). The location sensor 250 may also be configured as a wireless signal sensor capable of triangulating a location of the robot 200 and the user by way of wireless signals received from one or more wireless signal antennas.

The motorized wheel assembly 258 is coupled to the communication path 228 and communicatively coupled to the processor 230. As described in more detail below, the motorized wheel assembly 258 includes motorized wheels (not shown) that are driven by one or motors (not shown). The processor 230 may provide one or more drive signals to the motorized wheel assembly 258 to actuate the motorized wheels such that the robot 200 travels to a desired location, such as a location that the user wishes to acquire environmental information (e.g., the location of particular objects within at or near the desired location).

Still referring to FIG. 2, the light 252 is coupled to the communication path 228 and communicatively coupled to the processor 230. The light 252 may be any device capable of outputting light, such as, but not limited to, a light emitting diode, an incandescent light, a fluorescent light, or the like. Some embodiments include a power indicator light that is illuminated when the robot 200 is powered on. Some embodiments include an activity indicator light that is illuminated when the robot 200 is active or processing data. Some embodiments include an illumination light for illuminating the environment in which the robot 200 is located. Some embodiments may not include the light 252.

The proximity sensor 254 is coupled to the communication path 228 and communicatively coupled to the processor 230. The proximity sensor 254 may be any device capable of outputting a proximity signal indicative of a proximity of the robot 200 to another object. In some embodiments, the proximity sensor 254 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 254, such as embodiments in which the proximity of the robot 200 to an object is determine from inputs provided by other sensors (e.g., the camera 244, the speaker 240, etc.) or embodiments that do not determine a proximity of the robot 200 to an object 215.

The temperature sensor 256 is coupled to the communication path 228 and communicatively coupled to the processor 230. The temperature sensor 256 may be any device capable of outputting a temperature signal indicative of a temperature sensed by the temperature sensor 256. In some embodiments, the temperature sensor 256 may include a thermocouple, a resistive temperature device, an infrared sensor, a laser sensor, a bimetallic device, a change of state sensor, a thermometer, a silicon diode sensor, or the like. Some embodiments of the robot 200 may not include the temperature sensor 256.

Still referring to FIG. 2, the robot 200 may be powered by the battery 260, which is electrically coupled to the various electrical components of the robot 200. The battery 260 may be any device capable of storing electric energy for later use by the robot 200. In some embodiments, the battery 260 is a rechargeable battery, such as a lithium-ion battery or a nickel-cadmium battery. In embodiments in which the battery 260 is a rechargeable battery, the robot 200 may include the charging port 262, which may be used to charge the battery 260. Some embodiments may not include the battery 260, such as embodiments in which the robot 200 is powered the electrical grid, by solar energy, or by energy harvested from the environment. Some embodiments may not include the charging port 262, such as embodiments in which the apparatus utilizes disposable batteries for power.

Figure 3:
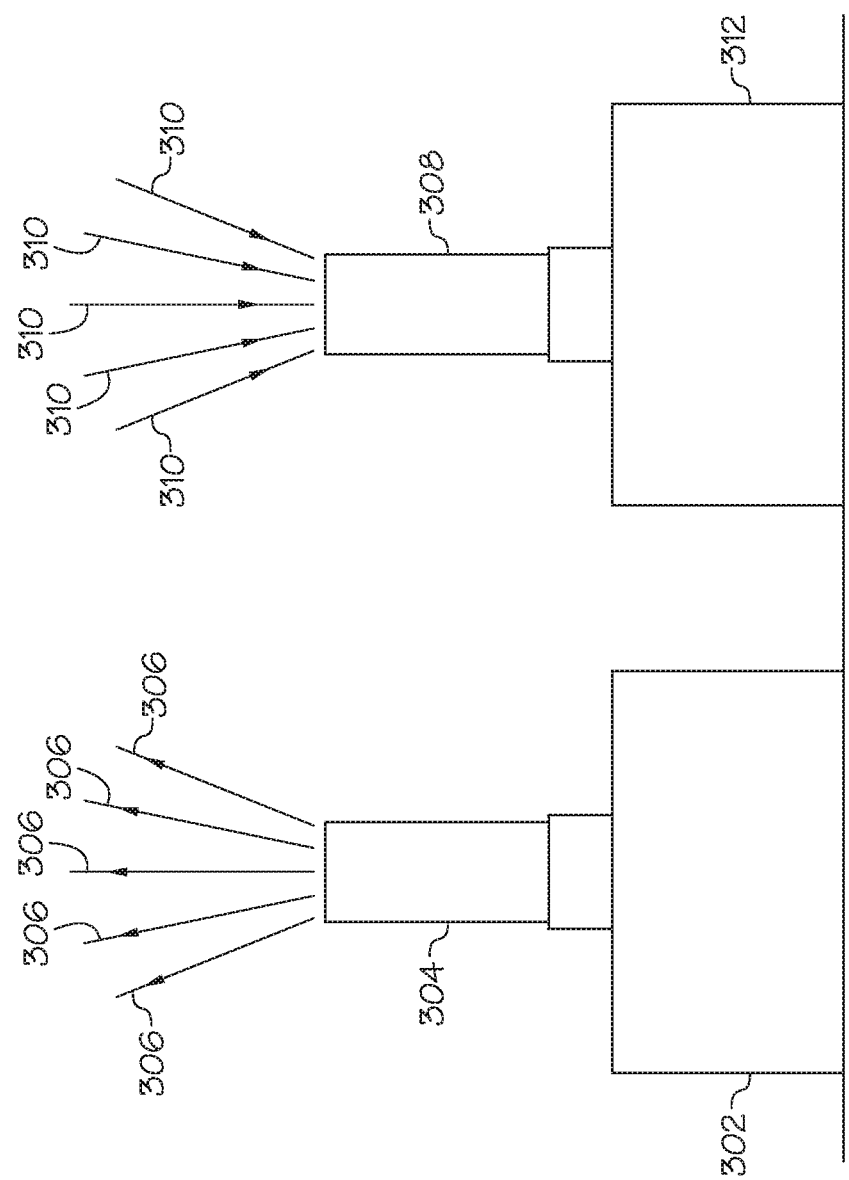
FIG. 3 schematically depicts an illuminator with an injecting bundle and a receiving sensor with a receiving bundle according to one or more embodiments described and illustrated herein.

Turning now to FIG. 3, an embodiment depicts an illuminator 302 with an injecting bundle 304 and a receiving sensor 312 with a receiving bundle 308. A robot 200 may feature one or more illuminators 302, which may be located in any suitable location(s) within the robot 200. In other embodiments illuminators 302 may be located on the exterior of or located remotely from a robot 200. An illuminator 302 may be any suitable device (e.g., LED, halogen, incandescent, cold cathode, induction, neon, photoluminescent, radioluminescent, fluorescent, high-intensity discharge, backlit illumination including digital light processing such as DLP projectors, etc.) capable producing any type of illumination (laser, an ultraviolet wavelength band, a visible light wavelength band, or an infrared wavelength band, etc.). Any suitable number of illuminators 302 may be utilized in various embodiments. Some embodiment may not utilize any illuminators 302. A receiving sensor 302 may utilize one or more pixels registered to an individual injecting conduit, an exterior point, or both.

In this embodiment, an injecting bundle 304 is connected to the illuminator 302. An injecting bundle 304 in this embodiment may include two or more injecting conduits 306, where any suitable number of injecting conduits 306 may be utilized. An injecting bundle 304 may utilize any suitable mechanism, such as an outer layer to wrap at least two injecting conduits 306 together. In this embodiment injecting conduits 306 may be unbundled from an injecting bundle 304 at any suitable distance from the illuminator 302. In some embodiments injecting conduits 306 may be rebundled with other or the same injecting conduits 306. An injecting conduit 306 may be any suitable type of transport mechanism capable transporting or delivering illumination, such as fiber optics, waveguides, etc. In various embodiments, an illuminator 302 may provide differing illumination to each injecting conduit 306. By way of non-limiting example, a different color may be provided to each of a plurality of injecting conduits 306.

A robot 200 may feature one or more receiving sensors 312, which may be located in any suitable location(s) within the robot 200. In other embodiments, receiving sensors 312 may be located on the exterior of, or located remotely from, a robot 200. A receiving sensor 312 may be any suitable type of object such as image sensors (e.g., charge-coupled device, photovoltaic, photoresistors, photo diode, proximity, an active distributed camera, etc.) and/or any other object capable receiving and/or processing any type of illumination. Any suitable number of receiving sensors 312 may be utilized in various embodiments. In some embodiments a receiving sensor 312 may utilize non-uniform output from one or more illuminators 302. By way of non-limiting example, where an illuminator 302 provides differing colors to a plurality of injecting conduits 306, the receiving sensor 312 may receive at least a subset of those colors from the receiving conduits 310, where such color data may be utilized for three-dimensional imaging.

In this embodiment the receiving bundle 308 is connected to the receiving sensor 312. The injecting bundle 304 in this embodiment may include two or more receiving conduits 310, where any suitable number of receiving conduits 310 may be utilized. A receiving bundle 308 may utilize any suitable mechanism, such as an outer layer to wrap at least two receiving conduits 308 together. In this embodiment receiving conduits 310 may be unbundled from a receiving bundle 308 at any suitable distance from the receiving sensor 312. In some embodiments receiving conduits 310 may be rebundled with other or the same receiving conduits 310. A receiving conduit 310 may be any suitable type of transport mechanism capable transporting or delivering illumination, such as fiber optics, waveguides, etc. In embodiments, a receiving sensor 312 may translate illumination from receiving conduits 310 into pixels, such that each receiving conduit 310 (and associated exterior point 402) corresponds to a pixel value. In some embodiments, the illumination carried by receiving conduits 310 may be combined to form combined pixel values. For example, multiple receiving conduits 310 from different exterior points 402 may converge into a receiving bundle 308, such that the receiving bundle 308 may be connected to a receiving sensor 312 utilizing an array of pixels, and the illumination received from each receiving conduit 310 may then be represented by a pixel value within the array of pixels. Although a pixel is utilized in this embodiment, any suitable type of representation of illumination carried by receiving conduits 310 may be utilized.

Figure 4:
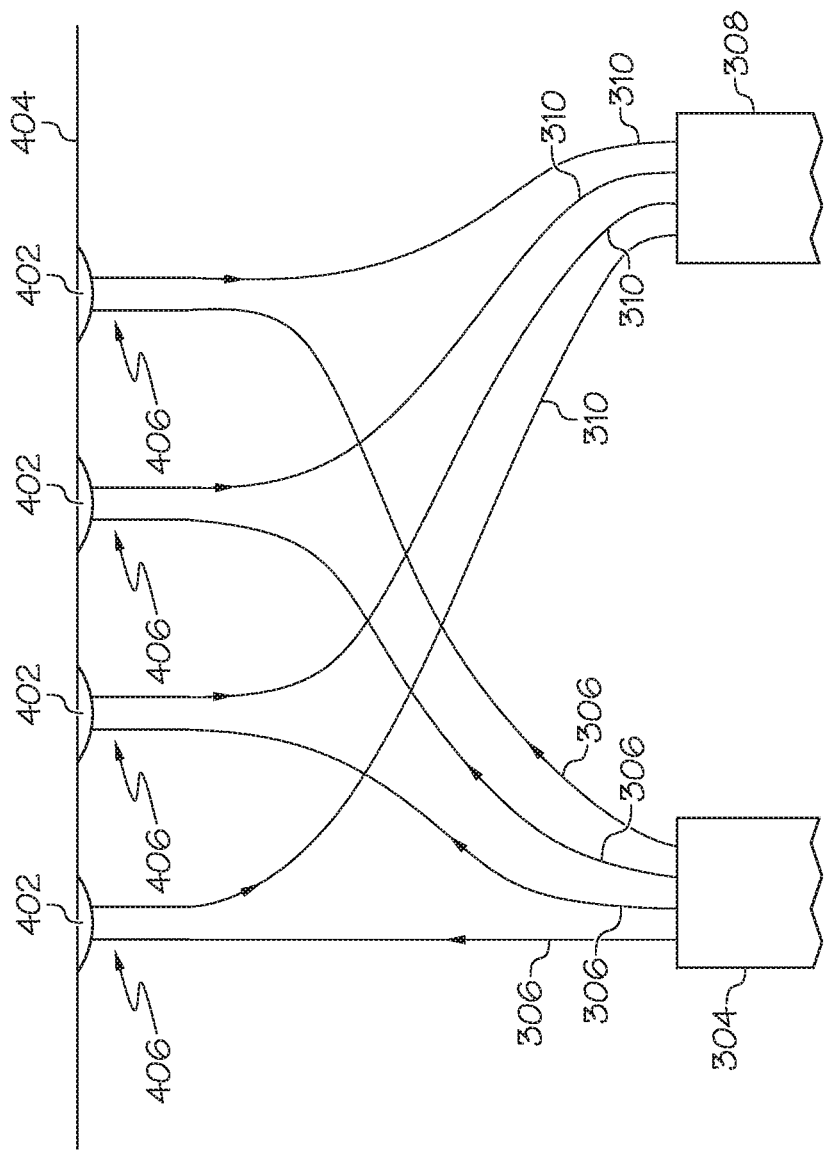
FIG. 4 schematically depicts a plurality of pairs at exterior points on a robot according to one or more embodiments described and illustrated herein.

FIG. 4 depicts a plurality of pairs 406 of an injecting conduit 306 and a receiving conduit 312 at exterior points 402 on a robot 200. As discussed above in FIG. 3, a plurality of injecting conduits 306 emerge from an injecting bundle 304 and a plurality of receiving conduits 312 may emerge from an injecting bundle 308. In the illustrated embodiment, each injecting conduit 306 terminates at an exterior point 402 at an exterior surface 404 of the robot 200. Exterior points 402 may located on various portions of robot 200, such as arms, legs, torso, head, etc. In various embodiments, the exterior surface 404 may be one or more surfaces utilizing any suitable type(s) of materials. In some embodiments, the exterior surface may be flexible and/or deformable. In some embodiments one or more injecting conduits 306 may directly provide illumination originating from one or more illuminators 302 to one or more exterior points 402. In various embodiments one or more receiving conduits 310 may directly provide illumination received at one or more exterior points 402 to one or more receiving sensors 312. In some embodiments pairs 406 may be located at different exterior points 402 on different exterior surfaces 404 of the robot.

In some embodiments each injecting conduit 306 may terminate at a different exterior point 402. In other embodiments no injecting conduits 306, or multiple injecting conduits 306, may terminate at any given exterior point 402. For example, an exterior point 402 may have no injecting conduits, such that one or more receiving conduits 312 at the exterior point 402 receive ambient illumination from external objects and/or illumination reflected by external objects as received from injecting conduits 306 located at other exterior points 402 on the robot 200. In the illustrated embodiment, each receiving conduit 312 terminates at an exterior point 402 at an exterior surface 404 of the robot 200. In some embodiments each receiving conduit 312 may originate at a different exterior point 402. In other embodiments no receiving conduits 312, or multiple receiving conduits 312, may begin at any given exterior point 402. For example, an exterior point 402 may have no receiving conduits, such that one or more injecting conduits 312 at the exterior point 402 provide illumination to objects that may reflect such illumination, which may be received by receiving conduits 306 located at other exterior points 402 on the robot 200. In the illustrated embodiment, each receiving conduit 312 terminates at an exterior point 402 at an exterior surface 404 of the robot 200. The terms "originate" and "terminate" may be used interchangeably in some embodiments. In some embodiments, an injecting conduit 306 and a receiving conduit 312 in a pair 406 are each part of a different bundle. In various embodiments at least one of the injecting bundles 304 comprises a plurality of injecting conduits 306 and at least one of the receiving bundles 308 comprises a plurality of receiving conduits 310.

Injecting conduits 306 and corresponding receiving conduits 310 form pairs 406 at exterior points 402. As an example, a pair 406 may have one injecting conduit 306 and one corresponding receiving conduit 310. However, any other suitable quantities of injecting conduits 306 and receiving conduits 310 may be utilized to form a pair in other embodiments. An exterior point 402 may have one, multiple, or no pairs 406 in various embodiments.

Figure 5:
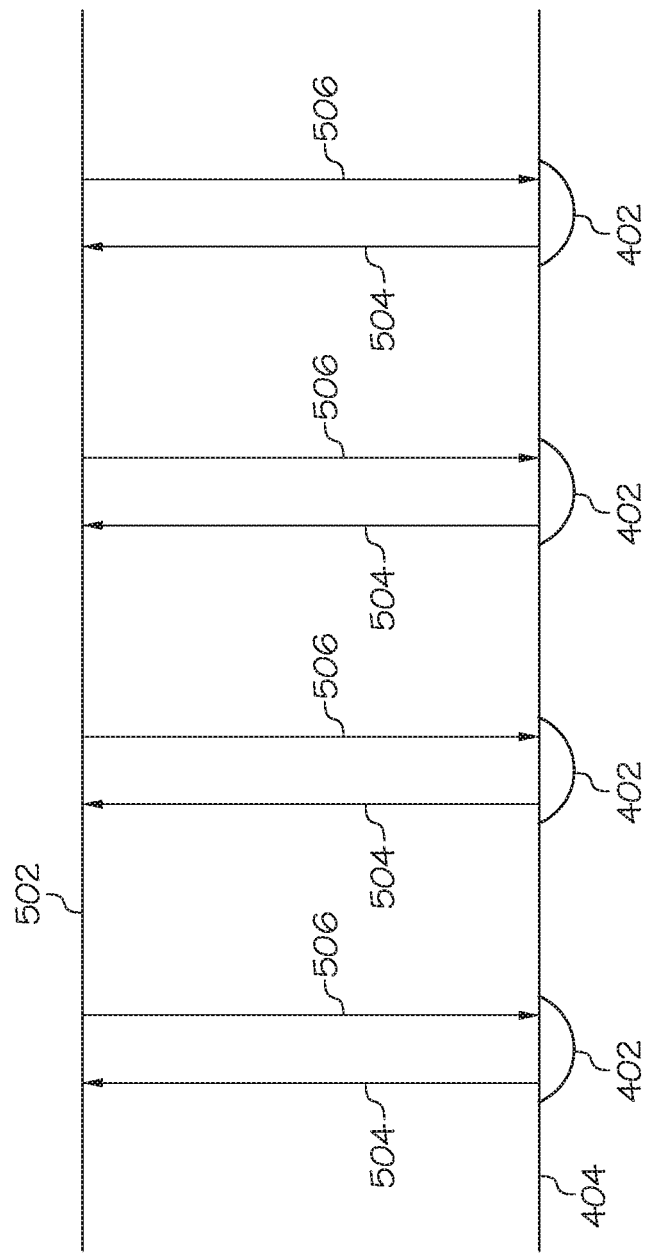
FIG. 5 schematically depicts illumination emitted from exterior points on a robot onto and reflected by an external object of according to one or more embodiments described and illustrated herein.

FIG. 5 depicts illumination emitted from exterior points 402 on a robot 200 onto and reflected by an external object 502. For example, an exterior surface 404 configured as an arm of the robot 200 may become in close proximity to the external object 502. As an example, an exterior point 402 may have a window, a lens, be opening, or have any material that permits illumination to completely or partially pass through the exterior surface 404 of the robot 200, which may be transparent or translucent. Injected illumination 504 may be received from one or more injecting conduits 306 and emitted from one or more exterior points 402 out of the exterior surface 404. When the injected illumination 504 reaches an external object 502, the injected illumination 504 may be reflected back by the external object 502 as reflected illumination 506. The fidelity of the reflected illumination 506 to the injected illumination 504 may depend on, for example, the reflectivity and/or distance of the external object 502 from the exterior points 402. When there is no external object in the path of the injected illumination 504, there is no reflected illumination 506. When an external object 502 is too far away with insufficient reflectivity from the exterior points 402 there is insufficient reflected illumination 506. When an external object 502 is close enough to one or more exterior points 402 with sufficient reflectivity for the distance, reflected illumination 506 may be received at the one or more exterior points 402. Once received at the one or more exterior points 402, the reflected illumination 506 may be transported by receiving conduits 310 to one or more receiving sensors 312. In some embodiments an injecting conduit 306 and a receiving conduit 310 may reside within the same housing.

Some embodiments may only utilize ambient and/or reflected illumination, for example, by not utilizing illuminators 302, injecting bundles 304, or injecting conduits 306. In such embodiments, illumination may be passively received from other illumination sources external to the robot 200, which may include illumination emanating from and/or reflected off of an external object 502.

Figure 6:
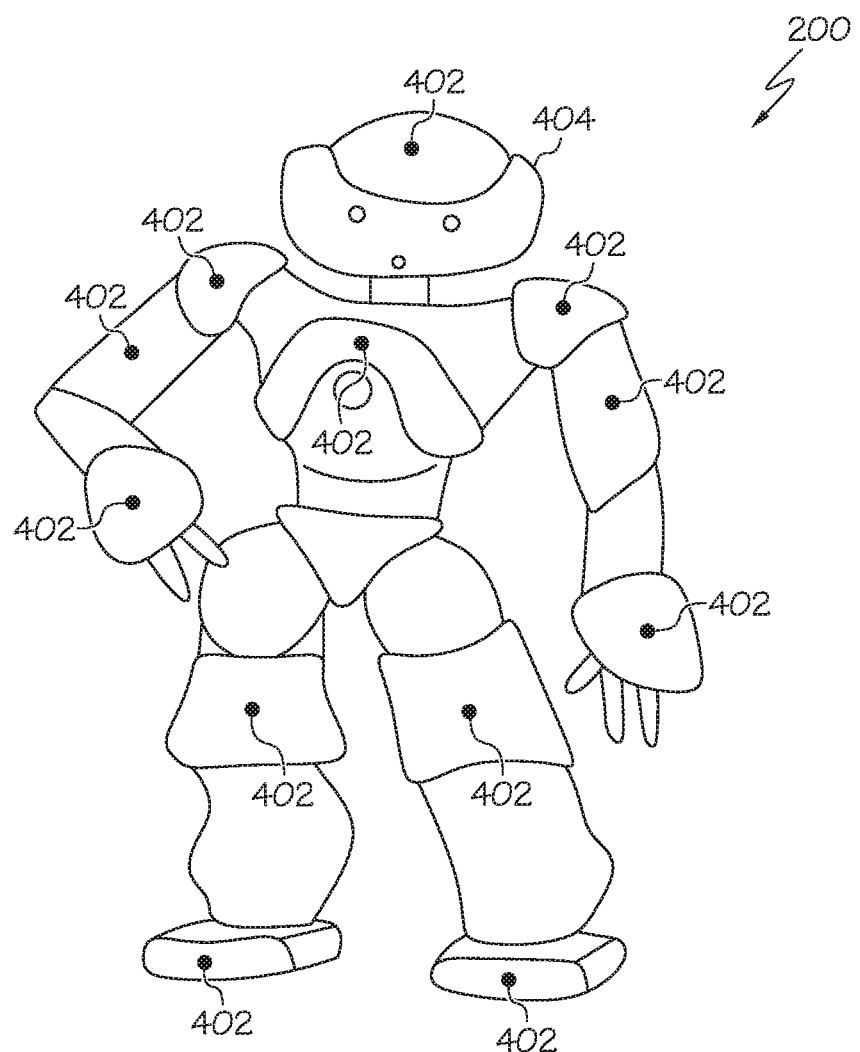
FIG. 6 schematically depicts a robot with external points according to one or more embodiments described and illustrated herein.

In FIG. 6, a robot 200 is depicted with multiple external points 402. In one example, an external object 502 may be located at a level at or above the head of the robot 200. The arms of the robot 200, which may each contain their own pixel arrays, may utilize their external points 402 for tactile sensing of the external object 502 by providing illumination from one or more illuminators 302, through one or more injecting bundles 304 having multiple injecting conduits 306, to provide illumination at the external points 402. Reflected illumination from the external object 502 may be reflected back to the external points 402 on the robot arms, such that the reflected illumination may enter the receiving conduits 310. The receiving conduits 310 may converge to form receiving bundles 308, such as within the arms that connect to one or more receiving sensors 312. The receiving sensors 312 may each be in the form of a pixel array that receives the illumination values from each receiving conduit 310. In this way, the pixel arrays in each arm as part of receiving sensors 312 may generate an array of pixel values that may be used to generate a pixel-based representation of the external object 502.

In another example, multiple external objects 502 may be located on opposite sides of the robot 200, such as in front and behind. The front-facing external points 402 of the robot 200, where each portion of the robot (arms, legs, heads, torso, etc.) may have their own receiving sensors 312 and associated pixel arrays. The external points 402 may provide for tactile sensing of these external objects 502 by providing illumination from one or more illuminators 302, through one or more injecting bundles 304 having multiple injecting conduits 306 to provide illumination at the front-facing and rear-facing external points 402. Reflected illumination from each of the external objects 502 may be reflected back to the front-facing and rear-facing external points 402 on the robot 200, relative to the positioning of the external objects 502. The reflected illumination may enter the receiving conduits 310 at the external points 402, which may converge to form receiving bundles 308 that connect to one or more receiving sensors 312 forming a pixel array value for the illumination received from each receiving conduit 310. In this way, the pixel arrays in the receiving sensors 312 throughout the robot 200 may each generate an array of pixel values that may be used to generate pixel-based representations of each external object 502. In an alternative example, the external objects 502 may be detected utilizing only ambient illumination from the environment, without illumination generated by illuminators 302 within the robot 200. In yet another alternative example, the external objects 502 may be detected utilizing a combination of ambient illumination in the environment and illumination generated by illuminators 302 within the robot 200.

Figure 7:
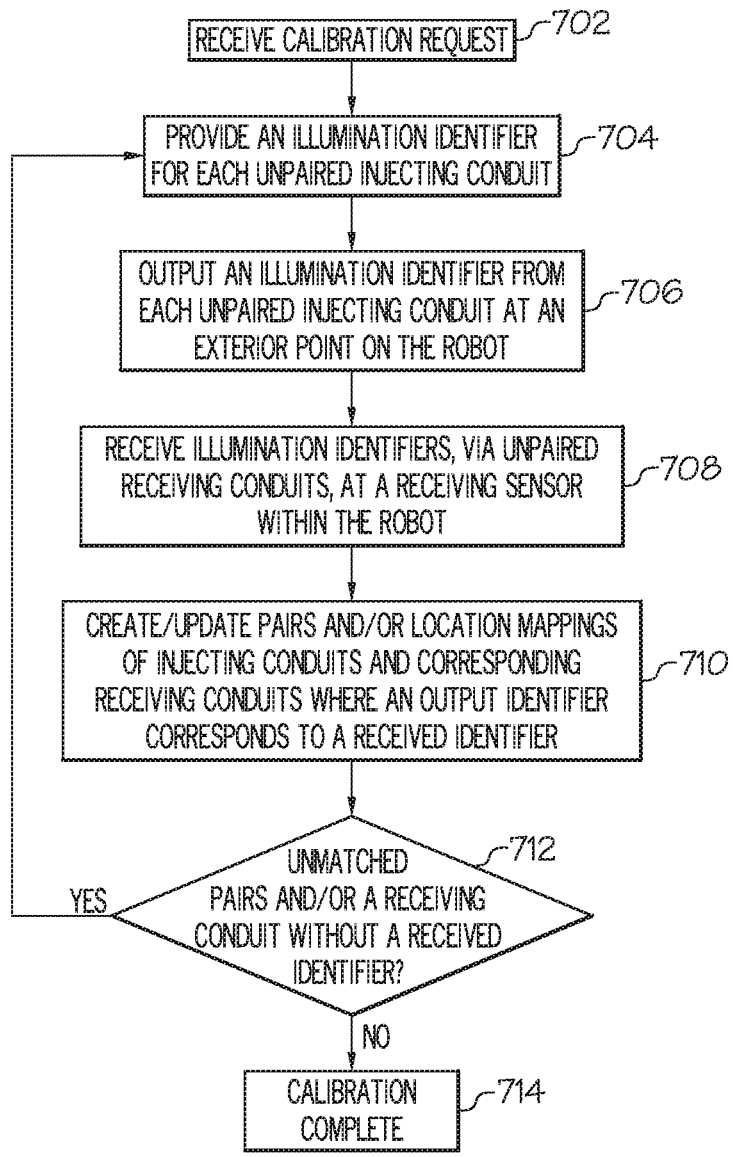
FIG. 7 is a flowchart depicting an exemplary process of calibrating conduit pairs with respect to exterior points on a robot according to one or more embodiments described and illustrated herein.

In FIG. 7, a flowchart depicts an exemplary process of calibrating pairs 406 with respect to exterior points 402 on a robot 200. For example, calibration may be used to determine which external points 402 correlate to which illuminators 302 and receiving sensors 312. Put another way, calibration may be utilized to map where each illuminator 302 is providing illumination at which external points 402 on the robot 200. Calibration may also be utilized to map the locations of the external points 400 on the robot for each corresponding receiving sensor 312. For example, a robot 200 may lose its memory contents (due to power loss, memory corruption, etc.), which may include the mapping of external points 402 to illuminators 302 and receiving sensors 312. Calibration may be utilized to re-establish or update this mapping relationship.

At block 702, a calibration request may be received. At block 704, an illumination identifier may be provided for each unpaired injecting conduit 306 at one or more illuminators 302, although in some embodiments this may be provided to all injecting conduits 306. An illumination identifier may be anything that can identify injected illumination 504, such as a color, intensity, or blinking pattern. At block 706, an illumination identifier may be output from each unpaired injecting conduit 306 at an exterior point 402 on the robot 200. At block 708, illumination identifiers may be received by unpaired receiving conduits 310 at one or more receiving sensors 312 within the robot 200. For example, an illuminator 302 may output a particular color, such as red, which may be output by an injecting conduit 306 and received by a receiving conduit 310 to be provided as a pixel value at a sensor array within a receiving sensor 312. By contrast, another illuminator 302, or the same illuminator 302, may provide another color, such as blue. The color blue may be output by a different injecting conduit 306 and received by a different receiving conduit 310 to be provided as a different pixel value at a sensor array within the same, or at a different, receiving sensor 312. In this way, the external points 402 on the robot 200 outputting and receiving the color red external points 402 that may be pinpointed and distinguished from those external points 402 on the robot 200 outputting and receiving the color blue. At block 710, pairs 406 and/or location mappings of injecting conduits 306 and/or corresponding receiving conduits 310 may be created and/or updated, where an output identifier may correspond to a received identifier. In various embodiments an output identifier may be anything that can identify reflected illumination 506, such as a color, intensity, or blinking pattern. Based upon the output of an injecting conduit 306 and/or a receiving conduit 310, a pixel (or pixels) may be registered and associated with a signal. The pixel (or pixels) may become associated with that injecting conduit 306 and/or that receiving conduit 310. At block 712, a determination may be made whether there are any unmatched pairs 406 and/or any receiving conduits 310 remain without a received identifier. If so, the flowchart may return to block 704. If not, then at block 714 the calibration may be completed.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot having perception-based tactile sensing, comprising:
   an external portion;
   an illuminator configured to output illumination of a different color to each of a plurality of injecting conduits;
   a receiving sensor configured to receive illumination;
   conduits, located at the external portion, comprising:
      the plurality of injecting conduits, traversing one or more housings of the robot, configured to:
         receive the illumination from the illuminator; and
         output the illumination to illuminate an object external to the robot; and
      a receiving conduit, traversing one or more housings of the robot, configured to:
         receive the illumination from the object external to the robot; and
         output the illumination to the receiving sensor.

2. The robot of claim 1, wherein at least one of the injecting conduits is configured to directly provide illumination originating from the illuminator to an exterior point on the robot.

3. The robot of claim 2, wherein the receiving conduit is configured to provide a direct connection for illumination received at the exterior point on the robot to the receiving sensor.

4. The robot of claim 3 wherein the exterior point on the robot comprises a lens or window.

5. The robot of claim 3 further comprising a processor configured to calibrate the location of each of a plurality of exterior points with respect to exterior portions of the robot.

6. The robot of claim 3 wherein a plurality of exterior points on the robot each correspond to a pixel in the receiving sensor.

7. The robot of claim 1, wherein at least one of the injecting conduits and the receiving conduit in a pair are each part of a different conduit bundle.

8. The robot of claim 1, further comprising a plurality of conduit bundles.

9. The robot of claim 8, wherein at least one of the injecting bundles comprises a plurality of injecting conduits and at least one of the receiving bundles comprises a plurality of receiving conduits.

10. The robot of claim 9, wherein the injecting conduits in the plurality of bundles originate from the illuminator.

11. The robot of claim 10, wherein the receiving conduits in the plurality of bundles terminate at the receiving sensor.

12. The robot of claim 11, further comprising a plurality of pairs wherein at least two of the pairs are located at different exterior points on different exterior surfaces of the robot.

13. The robot of claim 1, further comprising a plurality of pairs.

14. The robot of claim 13 wherein at least two of the pairs are located at different exterior points on different exterior surfaces of the robot.

15. The robot of claim 1 wherein the receiving sensor comprises an array of pixels.

16. The robot of claim 1 wherein one or more pixels are registered to an individual injecting conduit, an exterior point, or both.

17. The robot of claim 1 wherein the illuminator comprises a laser or infrared light source.

18. The robot of claim 1 wherein the different colors are utilized for three dimensional imaging.

19. A robot having perception-based tactile sensing, comprising:
   one or more external portions;
   an illuminator configured to output illumination of a different color to each of a plurality of injecting conduits;
   a receiving sensor configured to receive illumination;
   a plurality of pairs of conduits each located at the one or more external portions, wherein each pair comprises:
      an injecting conduit, traversing one or more housings of the robot, configured to:
         receive the illumination from the illuminator; and
         output the illumination to illuminate an object external to the robot,
      wherein the injecting conduit is configured to directly provide illumination originating from the illuminator to an exterior point on the robot; and
      a receiving conduit, traversing one or more housings of the robot, configured to:
         receive the illumination from the object external to the robot; and
         output the illumination to the receiving sensor, wherein the receiving conduit is configured to directly provide illumination received at the exterior point on the robot to the receiving sensor;
   a plurality of conduit bundles, wherein:
      at least two of the conduit bundles each comprise a plurality of injecting conduits and a plurality of receiving conduits; and
      the injecting conduits in the plurality of bundles originate from the illuminator;
   an external skin having exterior points each comprising a lens or window; and
   a processor configured to calibrate the location of each of a plurality of exterior points with respect to exterior portions of the robot.

* * * * *